US012054359B1

(12) United States Patent
Hubbard

(10) Patent No.: US 12,054,359 B1
(45) Date of Patent: Aug. 6, 2024

(54) ROLLER GUIDE MOUNTED ELEVATOR MONITORING SYSTEMS

(71) Applicant: OTIS ELEVATOR COMPANY, Farmington, CT (US)

(72) Inventor: James L. Hubbard, Kensington, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 18/351,166

(22) Filed: Jul. 12, 2023

(51) Int. Cl.
*B66B 1/34* (2006.01)
*B66B 7/04* (2006.01)
*B66B 7/12* (2006.01)

(52) U.S. Cl.
CPC ............ *B66B 7/046* (2013.01); *B66B 7/1246* (2013.01)

(58) Field of Classification Search
CPC .............................. B66B 7/046; B66B 7/1246
See application file for complete search history.

(56) References Cited

U.S. PATENT DOCUMENTS 6,945,296 B2 * 9/2005 Kunz ........................ B66B 7/02 156/391
6,963,064 B2 * 11/2005 Updegrave ........ G01D 5/34715 341/13
7,182,258 B2 * 2/2007 Foo .................... G01D 5/34715 235/462.01
7,265,336 B2 * 9/2007 Hataguchi .......... G01D 5/34707 250/231.13
7,358,865 B2 * 4/2008 Igaki ........................ G01D 5/38 250/233
7,362,242 B2 * 4/2008 Igarashi ................. G01D 11/30 341/13
7,414,238 B2 * 8/2008 Igarashi ................. H02K 11/33 356/616
7,663,276 B2 * 2/2010 Igarashi ................. H02K 11/22 310/67 R
7,838,815 B2 * 11/2010 Yamagata .......... G01D 5/34738 250/239

(Continued)

FOREIGN PATENT DOCUMENTS

CN 204535731 U 8/2015
CN 212109889 U 12/2020

(Continued)

*Primary Examiner* — Michael A Riegelman
(74) *Attorney, Agent, or Firm* — CANTOR COLBURN LLP

(57) ABSTRACT

Elevator systems include an elevator car and a roller guide associated therewith. A roller is supported on a frame of the roller guide and configured to rotate along a guide rail and limit movement of the elevator car in a first direction. A motion state sensing assembly is mounted to the roller guide and configured to measure a motion state of the elevator car. The motion state sensing assembly includes an optical target located on the roller and an optical encoder device and associated a processor arranged to direct optical energy toward the optical target and detect a response thereof. A sensor housing is mounted to the roller guide with the optical encoder device arranged within the housing. A communication assembly is in communication with the processor and an elevator controller for communication therebetween.

20 Claims, 9 Drawing Sheets

(56) References Cited

U.S. PATENT DOCUMENTS

| | | | | | |
|---|---|---|---|---|---|
| 7,982,175 | B2 * | 7/2011 | Bahari | G01D 5/34715 356/616 |
| 8,264,380 | B2 * | 9/2012 | Hasegawa | G01D 5/34707 341/15 |
| 8,546,745 | B2 * | 10/2013 | Lippuner | G01D 5/34723 250/239 |
| 9,091,568 | B2 * | 7/2015 | Geiger | G01D 5/34707 |
| 9,828,211 | B2 * | 11/2017 | Schonauer | F16F 15/002 |
| 9,975,733 | B2 * | 5/2018 | Cunningham | B66B 5/18 |
| 10,232,648 | B2 * | 3/2019 | Miyake | G01D 5/34715 |
| 10,494,228 | B2 * | 12/2019 | Swaybill | B66B 1/40 |
| 2009/0152452 | A1 * | 6/2009 | Lee | G01D 5/34792 250/231.14 |
| 2015/0101890 | A1 * | 4/2015 | Culp | G01D 5/3473 310/68 B |
| 2018/0244495 | A1 * | 8/2018 | Swaybill | B66B 1/3492 |
| 2019/0002235 | A1 * | 1/2019 | Roberts | B66B 5/0018 |

FOREIGN PATENT DOCUMENTS

| | | | |
|---|---|---|---|
| EP | 1426736 | A1 | 6/2004 |
| EP | 3130554 | A1 | 2/2017 |
| EP | 2964557 | B1 | 7/2019 |
| EP | 3421400 | B1 | 5/2020 |
| EP | 3730437 | A1 | 10/2020 |
| EP | 3786098 | A1 | 3/2021 |
| EP | 3828510 | A1 | 6/2021 |
| EP | 3344569 | B1 | 9/2022 |
| JP | 2001031350 | A | 2/2001 |
| JP | 2005192277 | A | 7/2005 |
| JP | 2006292724 | A | 10/2006 |
| JP | 2007309692 | A | 11/2007 |
| WO | 2017040136 | A1 | 3/2017 |

* cited by examiner

ROLLER GUIDE MOUNTED ELEVATOR MONITORING SYSTEMS

BACKGROUND

The subject matter disclosed herein generally relates to elevator systems and, more particularly, to elevator monitoring systems that are mounted or otherwise attached to a roller guide of the elevator systems.

An elevator system typically includes a plurality of belts or ropes (load bearing members) that move an elevator car vertically within a hoistway or elevator shaft between a plurality of elevator landings. When the elevator car is stopped at a respective one of the elevator landings, changes in magnitude of a load within the elevator car can cause changes in vertical motion state (e.g., position, speed, velocity, acceleration, etc.) of the elevator car relative to the landing. The elevator car can move vertically down relative to the elevator landing, for example, when one or more passengers and/or cargo move from the landing into the elevator car. In another example, the elevator car can move vertically up relative to the elevator landing when one or more passengers and/or cargo move from the elevator car onto the landing. Such changes in the vertical position of the elevator car can be caused by soft hitch springs and/or stretching and/or contracting of the load bearing members, particularly where the elevator system has a relatively large travel height and/or a relatively small number of load bearing members. Under certain conditions, the stretching and/or contracting of the load bearing members and/or hitch springs can create disruptive oscillations in the vertical position of the elevator car, e.g., an up and down "bounce" motion. Such stretching and/or contracting of the load bearing members may also lead to position inaccuracies that cannot be controlled by an elevator machine encoder.

SUMMARY

According to some embodiments, elevator systems are provided. The elevator systems include an elevator car arranged to travel on a guide rail through an elevator shaft, a roller guide mounted to an exterior of the elevator car, a roller supported on a frame of the roller guide, the roller configured to engage with and rotate along the guide rail and limit movement of the elevator car in a first direction that is normal to a direction of travel of the elevator car, and a motion state sensing assembly mounted to the roller guide and configured to measure a motion state of the elevator car within the elevator shaft. The motion state sensing assembly includes an optical target located on the roller, a printed circuit board having an optical encoder device and a processor mounted thereto, wherein the optical encoder device and the processor are electrically connected, and wherein the optical encoder device is arranged to direct optical energy toward the optical target and detect a response of the directed optical energy, a sensor housing mounted to the roller guide, wherein the optical encoder device is arranged within the sensor housing, and a communication assembly in communication with the processor and an elevator controller, wherein the processor is configured to communicate data from the processor to the elevator controller using the communication assembly.

In addition to one or more of the features described herein, or as an alternative, further embodiments of the elevator systems may include that the elevator controller is configured to control operation of the elevator car based on the data communicated from the motion state sensing assembly.

In addition to one or more of the features described herein, or as an alternative, further embodiments of the elevator systems may include an accelerometer mounted to the printed circuit board and electrically connected to the processor.

In addition to one or more of the features described herein, or as an alternative, further embodiments of the elevator systems may include that the processor is configured to receive motion state data from each of the optical encoder device and the accelerometer.

In addition to one or more of the features described herein, or as an alternative, further embodiments of the elevator systems may include that the sensor housing comprises an opening that is arranged to align with the optical encoder element.

In addition to one or more of the features described herein, or as an alternative, further embodiments of the elevator systems may include that the communication assembly comprises a wireless communication chip.

In addition to one or more of the features described herein, or as an alternative, further embodiments of the elevator systems may include that the communication assembly comprises a cable and a connector, wherein the cable electrically connects to the printed circuit board and the connector is configured to connect to another device to transmit the data from the processor to the elevator controller.

In addition to one or more of the features described herein, or as an alternative, further embodiments of the elevator systems may include that the roller comprises a hub and the optical target is located on a surface of the hub.

In addition to one or more of the features described herein, or as an alternative, further embodiments of the elevator systems may include that the optical target comprises a first optical target located at an inner diameter of the hub and a second optical target located at an outer diameter of the hub.

In addition to one or more of the features described herein, or as an alternative, further embodiments of the elevator systems may include a second roller mounted to the roller guide, wherein the second roller is configured to limit movement of the elevator car in a second direction that is normal to the first direction and a second motion state sensing assembly associated with the second roller.

In addition to one or more of the features described herein, or as an alternative, further embodiments of the elevator systems may include a third roller mounted to the roller guide, wherein the third roller is configured to limit movement of the elevator car in one of the first direction and the second direction.

In addition to one or more of the features described herein, or as an alternative, further embodiments of the elevator systems may include that at least one of the sensor housing and the printed circuit board is affixed to a non-rotating axle of the roller.

In addition to one or more of the features described herein, or as an alternative, further embodiments of the elevator systems may include that the processor is configured to process data received from the optical encoder device to determine a motion state of the elevator car, wherein the motion state comprises at least one of a position, a speed, a velocity, and an acceleration of the elevator car within the elevator shaft.

In addition to one or more of the features described herein, or as an alternative, further embodiments of the elevator systems may include that at least one of the processed data and the determined motion state is transmitted to the elevator controller using the communication assembly.

In addition to one or more of the features described herein, or as an alternative, further embodiments of the elevator systems may include that the optical target comprises a pattern of markings about the roller.

In addition to one or more of the features described herein, or as an alternative, further embodiments of the elevator systems may include that the pattern of markings comprises a concentration of markings of between 10 to 15 lines per mm.

In addition to one or more of the features described herein, or as an alternative, further embodiments of the elevator systems may include that the pattern of markings comprises a pattern of alternating reflective and non-reflective lines.

In addition to one or more of the features described herein, or as an alternative, further embodiments of the elevator systems may include that the optical target is configured to generate 2,000 pulses per revolution (PPR) or greater.

In addition to one or more of the features described herein, or as an alternative, further embodiments of the elevator systems may include that the encoder device comprises an interpolation operation of 2× to 4× resulting in at least 4,000 PPR to 8,000 PPR.

In addition to one or more of the features described herein, or as an alternative, further embodiments of the elevator systems may include that the optical encoder device is arranged with a separation distance from the optical target of 0.5-1.25 mm.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

Figure 1A:
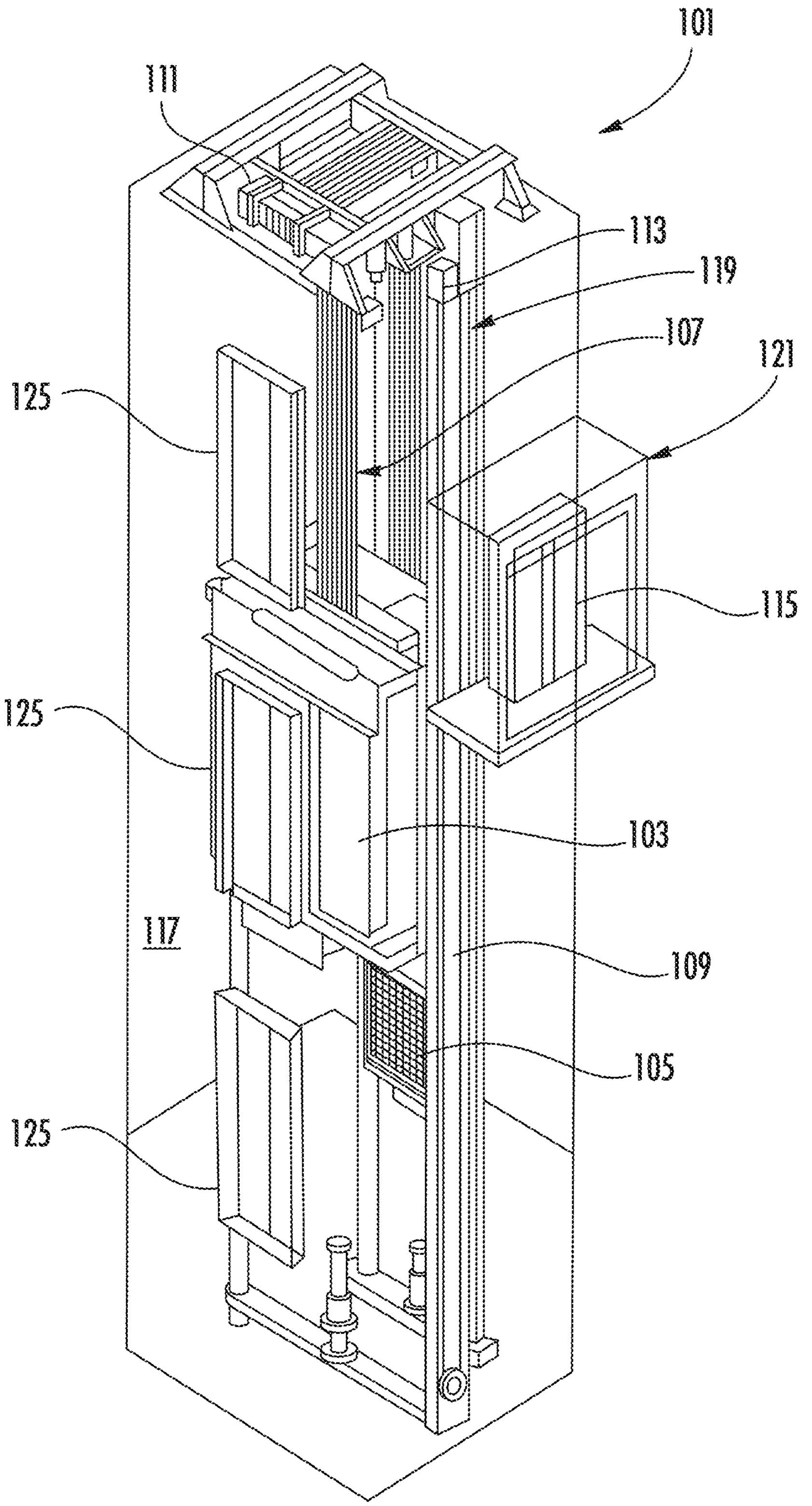
FIG. 1A is a schematic illustration of an elevator system that may employ various embodiments of the disclosure.

FIG. 1A is a perspective view of an elevator system 101 including an elevator car 103, a counterweight 105, a load bearing member 107, a guide rail 109, an elevator machine 111, a position encoder 113, and a controller 115. The elevator car 103 and counterweight 105 are connected to each other by the load bearing member 107. The load bearing member 107 may include or be configured as, for example, one or more ropes, steel cables, coated-steel belts, etc. as will be appreciated by those of skill in the art. The counterweight 105 is configured to balance a load of the elevator car 103 and is configured to facilitate movement of the elevator car 103 concurrently and in an opposite direction with respect to the counterweight 105 within an elevator shaft 117 and along the guide rail 109.

The load bearing member 107 engages the elevator machine 111, which is part of an overhead structure of the elevator system 101. The elevator machine 111 is configured to control movement of the elevator car 103 and the counterweight 105. The position encoder 113, which is an optional component, may be mounted on an upper sheave of a speed-governor system 119 and may be configured to provide position signals related to a position of the elevator car 103 within the elevator shaft 117. In other embodiments, the position encoder 113 may be directly mounted to a moving component of the elevator machine 111, or may be located in other positions and/or configurations as known in the art.

The controller 115 is located, in this non-limiting schematic illustration, in a controller room 121 of the elevator system 101 and is configured to control the operation of the elevator system 101, and particularly the elevator car 103. For example, the controller 115 may provide drive signals to the elevator machine 111 to control acceleration, deceleration, leveling, stopping, etc. of the elevator car 103 within and/or along the elevator shaft 117. The controller 115 may also be configured to receive position signals from the position encoder 113 and/or other motion state sensors of the elevator system 101. When moving up or down within the elevator shaft 117 along the guide rail 109, the elevator car 103 may stop at one or more landings 125 as controlled by the controller 115. Although shown in the controller room 121, those of skill in the art will appreciate that the controller 115 can be located and/or configured in other locations or positions within the elevator system 101 without departing from the scope of the present disclosure.

The elevator machine 111 may include a motor or similar driving mechanism. For example, in some embodiments and configurations, the elevator machine 111 may be configured to include an electrically driven motor. A power supply for the motor may be any power source, including a power grid, which is supplied to the motor of the elevator machine 111.

Although shown and described with a roping-type system, elevator systems that employ other methods and mechanisms of moving an elevator car within an elevator shaft may employ embodiments of the present disclosure. FIG. 1A is merely a non-limiting example presented for illustrative and explanatory purposes.

Figure 1B:
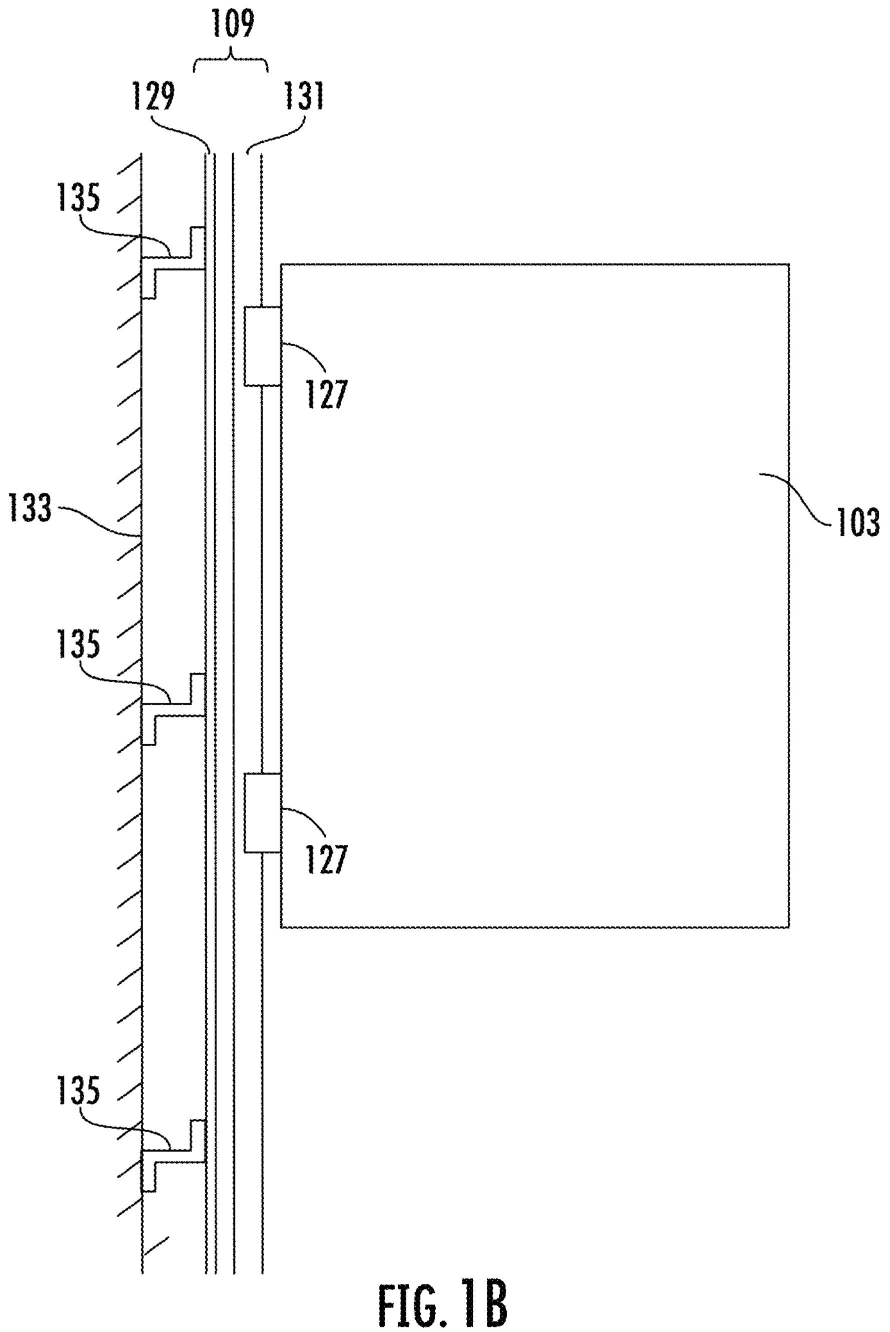
FIG. 1B is a side schematic illustration of an elevator car of FIG. 1A attached to a guide rail track.

FIG. 1B is a side view schematic illustration of the elevator car 103 as operably connected to the guide rail 109. As shown, the elevator car 103 connects to the guide rail 109 by one or more guiding devices 127. The guiding devices 127 may be guide shoes, guide rollers, etc., as will be appreciated by those of skill in the art. The guide rail 109 defines a guide rail track that has a base 129 and a blade 131 extending therefrom. The guiding devices 127 of the elevator car 103 are configured to run along and/or engage with the blade 131 of the guide rail 109. The guide rail 109 mounts to a wall 133 of the elevator shaft 117 (shown in FIG. 1A) by one or more mounting brackets 135. The mounting brackets 135 are structural frames or supports that are configured to fixedly mount to the wall 133, such as by bolts, fasteners, etc. as known in the art. The base 129 of the guide rail 109 fixedly attaches to the mounting brackets 135, and thus the guide rail 109 can be fixedly and securely mounted to the wall 133. As will be appreciated by those of skill in the art, a guide rail of a counterweight (e.g., counterweight 105) of an elevator system may be similarly configured to travel along one or more guide rails.

Embodiments provided herein are directed to apparatuses, systems, and methods related to elevator control during travel and/or at a landing. Embodiments of the present disclosure are directed to components for motion state sensing that are arranged with a roller guide. Such motion state sensing systems may include one or more encoders, accelerometers, and/or other sensors and devices to monitor or detect motion of the elevator car within the elevator shaft. As used herein, the term “motion state” refers to position, speed, and/or acceleration of the elevator car within the elevator shaft. For example, embodiments of the present disclosure are configured to provide motion state information regarding position and/or movement of an elevator car within and/or along an elevator shaft.

In some embodiments, vibration compensation systems may be configured to receive information from the motion state sensing system to rapidly adjust and account for bounce, oscillations, and/or vibrations and/or position inaccuracies relative to an elevator landing level within the elevator system in response to monitoring and/or sensing systems as described herein. One type of compensation system may be an elevator dynamic compensation control mode that is a mode of operation used at landings when an elevator car may move up or down (e.g., bounce) due to load changes and/or extension/contraction of load bearing members (e.g., a continuous re-levelling feature). According to embodiments provided herein, systems, structures, and methods of operation are provided to enable improved motion state detection with respect to the location and/or motion of an elevator car within an elevator shaft. In some embodiments, integrated and/or mounted motion state sensing assemblies and systems are integrated or arranged relative to roller guides of an elevator car to provide accurate motion state information of the elevator car within an elevator shaft. As noted, the term “motion state” as used herein include various states of position/motion, including position, speed, velocity, and/or acceleration.

In addition to re-leveling and dynamic compensation control, embodiments provided herein can be used for normal operation/motion control, automated recover options, diagnostics, calibration at installation, elevator car position monitoring, etc. Thus, embodiments of the present disclosure are not limited to one specific application, and any specific applications described herein are provided for illustrative and explanatory purposes only.

Embodiments described herein are directed to incorporating a motion state detection element and/or functionality into roller guides of an elevator car (e.g., guiding devices 127 shown in FIG. 1B). That is, in accordance with embodiments of the present disclosure, one or more motion state sensing elements (e.g., encoders, accelerometers, etc.) are incorporated into the guiding device such that an accurate motion state of the elevator car within the elevator shaft can be determined. The motion state information can then be used to minimize vibration, oscillation, and bounce of the elevator car. Such motion state sensing elements may include, without limitation, encoders (e.g., optical encoders) and accelerometers and associated components for processing data collected by such devices and transmitting such data (processed or raw) to an elevator controller for feedback to an elevator control operation.

Figure 2A:
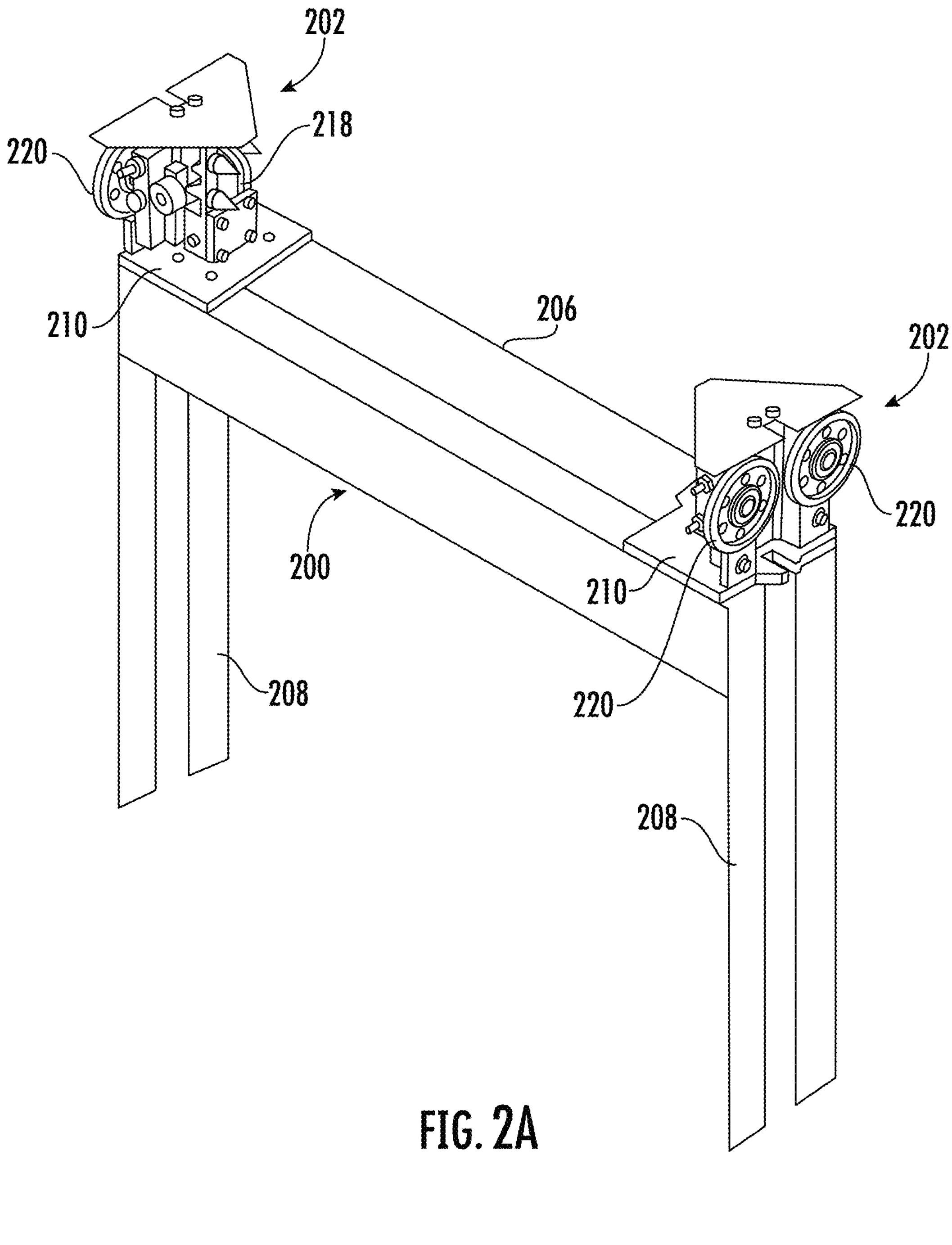
FIG. 2A is a partial isometric illustration of an elevator car frame having roller guides in accordance with an embodiment of the present disclosure mounted thereto.
Figure 2B:
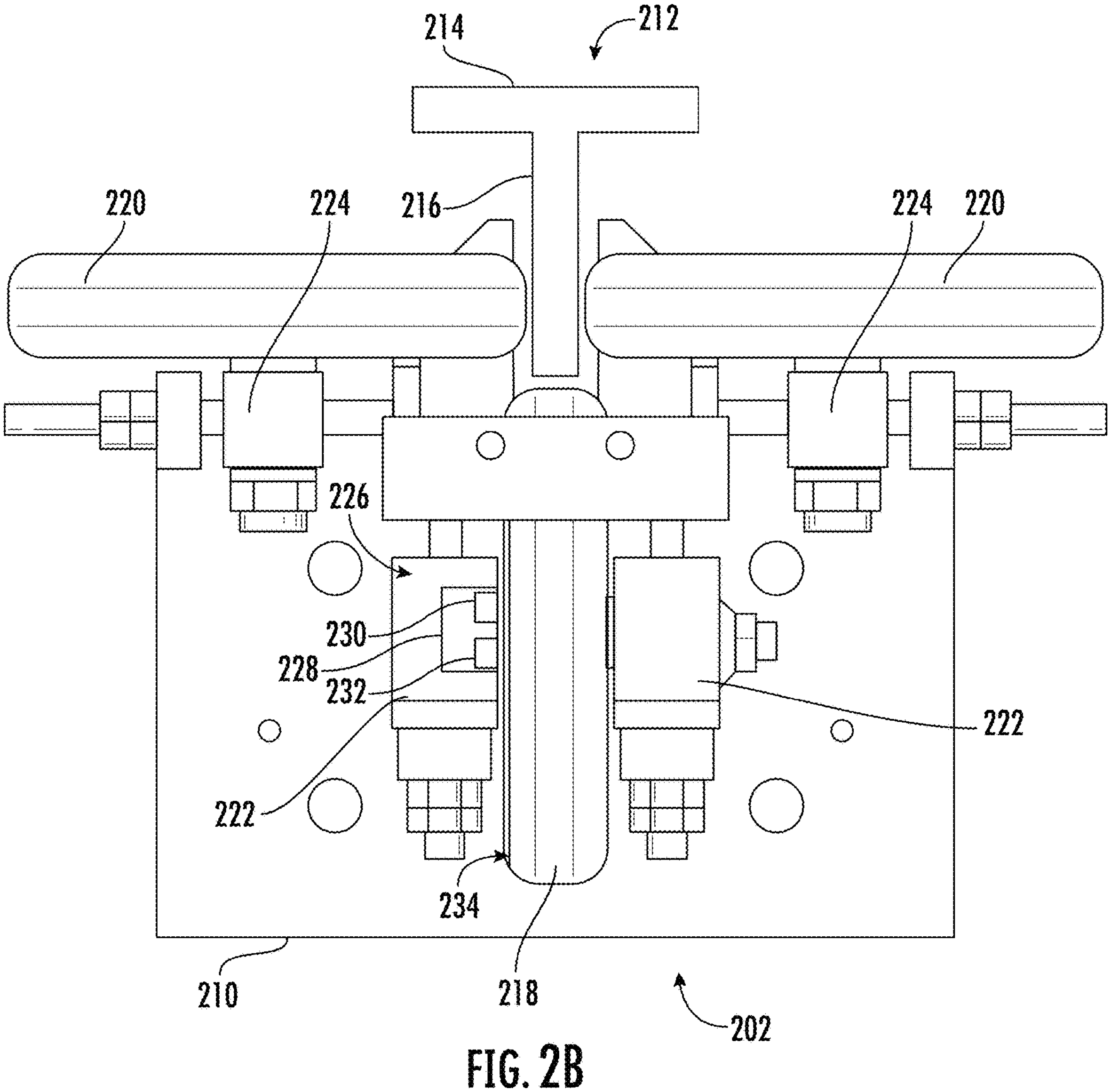
FIG. 2B is a plan view schematic illustration of one of the roller guides of FIG. 2A.

Turning now to FIGS. 2A-2B, schematic illustrations of elevator car guiding devices in accordance with a non-limiting embodiment of the present disclosure are shown. FIG. 2A is a partial isometric illustration of an elevator car frame 200 having two elevator car guiding devices 202 installed thereon. FIG. 2B is a top-down schematic illustration of one elevator car guiding device 202 as engaged with a guide rail 212 of an elevator system. The elevator car frame 200 includes a crosshead frame 206 extending between vertical stiles 208. The elevator car guiding devices 202 are mounted to at least one of the crosshead frame 206 and the vertical stiles 208, as known in the art, at a mounting base 210. The mounting base 210 defines at least part of a roller guide frame that is used to mount and support rolling components to an elevator car. The crosshead frame 206 and the vertical stiles 208 may define a part of a frame of an elevator car and may be arranged on an exterior of a passenger compartment (elevator car cab). That is, the crosshead frame 206 and the vertical stiles 208 and components mounted or attached thereto are components that are exposed to an elevator shaft and may interact with elements within the elevator shaft (e.g., guide rails, load bearing members, etc.).

The elevator car guiding devices 202 are each configured to engage with and move along a guide rail 212 (shown in FIG. 2B). The guide rail 212 has a base 214 and a blade 216 and the elevator car guiding device 202 engages with and moves along the blade 216 of the guide rail 212. The base 214 supports the blade 216 and is configured to fixedly attach to a wall of an elevator shaft or is otherwise mounted and installed within an elevator shaft. As shown in FIG. 2B, the elevator car guiding device 202 includes a first roller 218 and two second rollers 220. In the present configuration and arrangement, as appreciated by those of skill in the art, the first roller 218 is a side-to-side roller and the second rollers 220 are front-to-back rollers. That is, the rollers are configured to constrain or prevent movement of an elevator car in direction normal to a direction of travel along a guide rail within an elevator shaft. As shown, each of the first and second rollers 218, 220 include roller wheels as known in the art. The roller wheels are configured to contact and roll along a surface of the blade 216 of the guide rail 212. Although a specific configuration and arrangement is shown in FIGS. 2A-2B, those of skill in the art will appreciate that embodiments described herein are applicable to various other elevator car guiding device configurations/arrangements.

The rollers 218, 220 are movably or rotatably mounted to the mounting base 210 by a first support bracket 222 and second support brackets 224, respectively. As will be appreciated by those of skill in the art, roller guides typically utilize wheels with rolling element bearings mounted on stationary pins (spindles) fixed to pivoting arms supported by the roller guides base, which in turn interfaces with the car frame, as described above. The pivoting arm is retained by a stationary pivot pin fixed to the base. A spring is configured to provide a restoring force and a displacement stop (e.g., a bumper) is provided to constrain relative displacement of the respective roller element with respect to the guide rail 212. The roller elements (e.g., wheels) contact the guide rails of the elevator system and spin with the vertical motion of the car.

As shown in FIGS. 2A-2B, embodiments of the present disclosure replace one pivoting arm associated with the roller 218 with an arm, frame, or support that supports a motion state sensing assembly 226 arranged relative to the roller 218. It will be appreciated that motion state sensing assemblies of the present disclosure may be mounted or attached in other configurations or by other mechanisms, such as by being supported by a roller that has either a fixed axle location or pivot arm axle location. The motion state sensing system 226 may be configured to monitor a rotation of the roller 218 and process information obtained regarding the rotation to determine a motion state of an associated elevator car (e.g., position, speed, acceleration). Accordingly, to enable motion state sensing in accordance with embodiments of the present disclosure, in the embodiment shown in FIGS. 2A-2B, one of the support brackets 222 also supports the motion state sensing assembly 226. The motion state sensing assembly 226, as illustrated, includes a printed circuit board (PCB) 228 with, at least, a processor 230 and an optical encoder 232 mounted thereon. Although shown and described herein with the motion state sensing assembly 226 supported on or by one of the support brackets 222, those of skill in the art will appreciate that a separate and/or dedicated support or other structure can be used to mount the motion state sensing assembly 226 to the mounting base 210 or otherwise enable the motion state sensing assembly 226 to monitor a motion or rotation of at least one of the rollers 218, 220.

The motion state sensing assembly 226 is configured to determine a motion state of an elevator car within an elevator shaft. The motion state sensing assembly 226, in some embodiments such as that shown in FIGS. 2A-2B, includes the process 230 and the optical encoder 232 mounted on the PCB 228. The optical encoder 232 is arranged relative to a roller 218, 220 (illustratively shown relative to roller 218) and is configured to detect rotation of the roller 218. The rotation may be detected by positioning the optical encoder 232 to direct light or other optical signal toward a side of the roller 218. The roller 218 may include an encoded element 234 on a surface thereof (e.g., colored pattern, faceted surface, textured or patterned surface, etc.) with the encoded element 234 configured to cause a change in reflection of the optical signal transmitted from the optical encoder 232 toward the encoded element 234. For example, the optical encoder 232 may project a light beam toward the encoded element 234 and monitor for a reflected signal.

The optical encoder 232 and/or the processor 230 may be configured to convert the detected optical signals into an angular position or motion of the roller 218. This angular position and/or motion of the roller 218 may further be converted into an analog or digital code or signal. In some embodiments, the processor 230 may process the code or signal to generate a motion state output which may be transmitted to an elevator controller or the like. The motion state output may be a digital signal transmitted from the motion state sensing assembly 226 to an elevator controller.

In some embodiments, the signal produced by the motion state sensing assembly 226 can be transmitted to an elevator machine and/or controller to determine a specific position of the associated elevator car within the elevator shaft. From the position and/or an actively changing position, a motion state of the elevator car to which the motion state sensing assembly 226 is attached can be obtained. Accordingly, the motion state sensing assembly 226 can include various electrical components, such as memory, additional processor(s), and communication components (e.g., wired and/or wireless communication controllers) to determine a motion state and transmit such information to a controller or elevator machine such that the controller or elevator machine can determine an accurate motion state of the elevator car. With such information, the controller or elevator machine can perform improved control, such as, for example, during dynamic compensation control modes of operation and/or to prevent vibrations, oscillations, and/or bounce of the elevator car.

In accordance with embodiments of the present disclosure, the motion state sensing assembly 226 provides for a no-contact motion state monitoring. As such, fewer components may be required to monitor the motion state of the elevator car. For example, because the optical encoder 232 does not mechanically couple to the roller 218, fewer shafts, connectors, and/or supports are required. Additionally, the processor 230 of the motion state sensing assembly 226 may provide for onboard processing of data obtained from the optical encoder 232 and/or other components of the motion state sensing assembly 226, such as an accelerometer. Accordingly, data may be pre-processed at the motion state sensing assembly 226 prior to transmission of such data to an elevator controller, thus reducing bandwidth requirements for data transfer and the like.

Figure 3A:
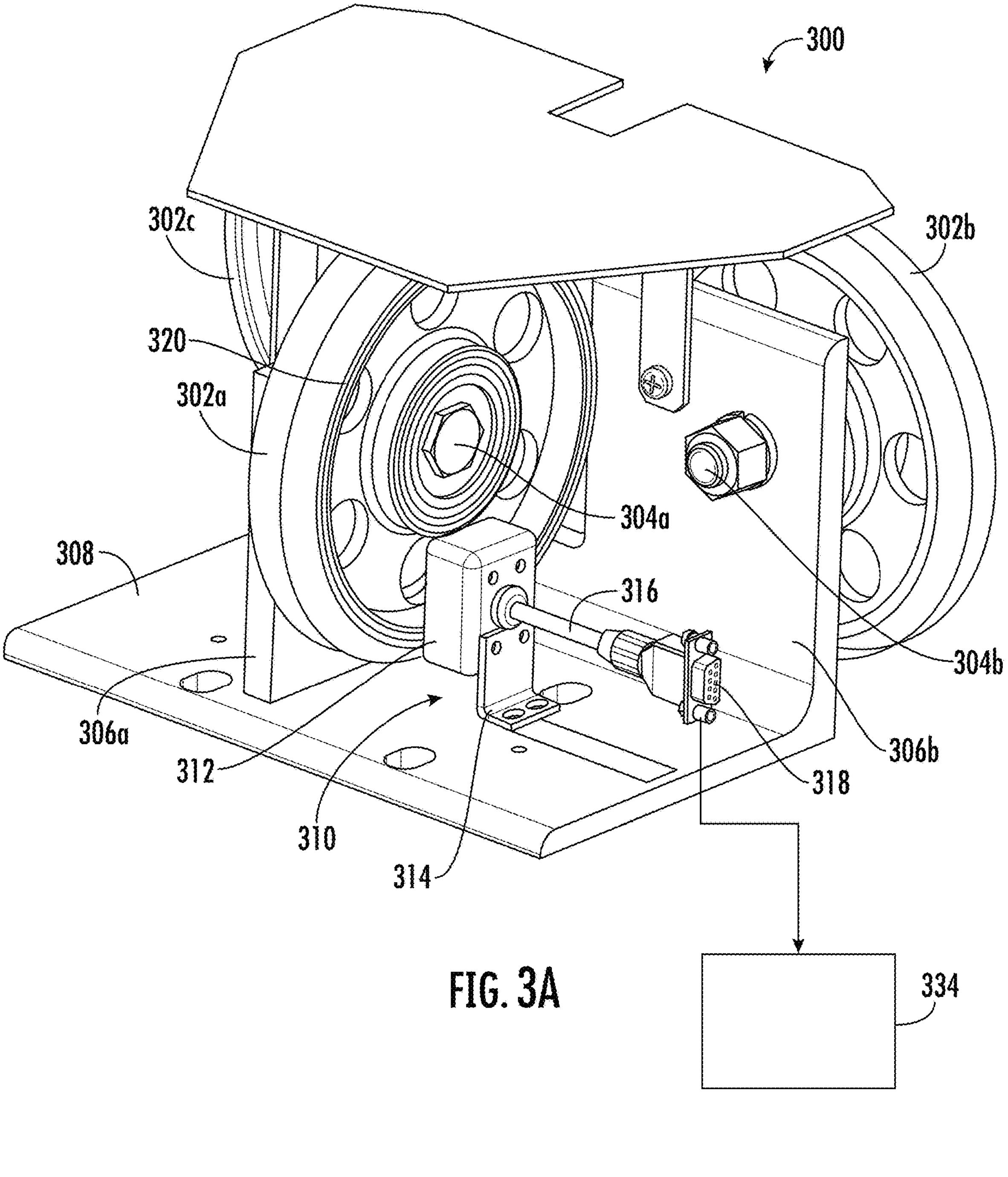
FIG. 3A is a schematic illustration of an elevator car guiding device in accordance with an embodiment of the present disclosure.
Figure 3B:
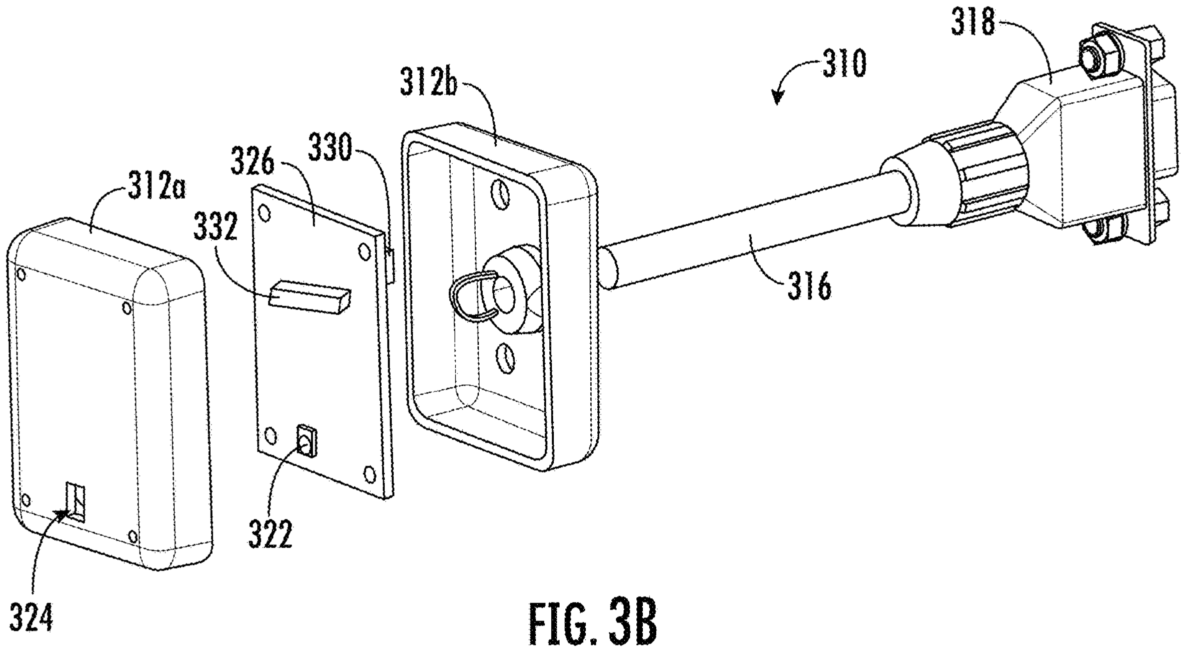
FIG. 3B is a schematic illustration of a motion state sensing assembly of the elevator car guiding device of FIG. 3A.
Figure 3C:
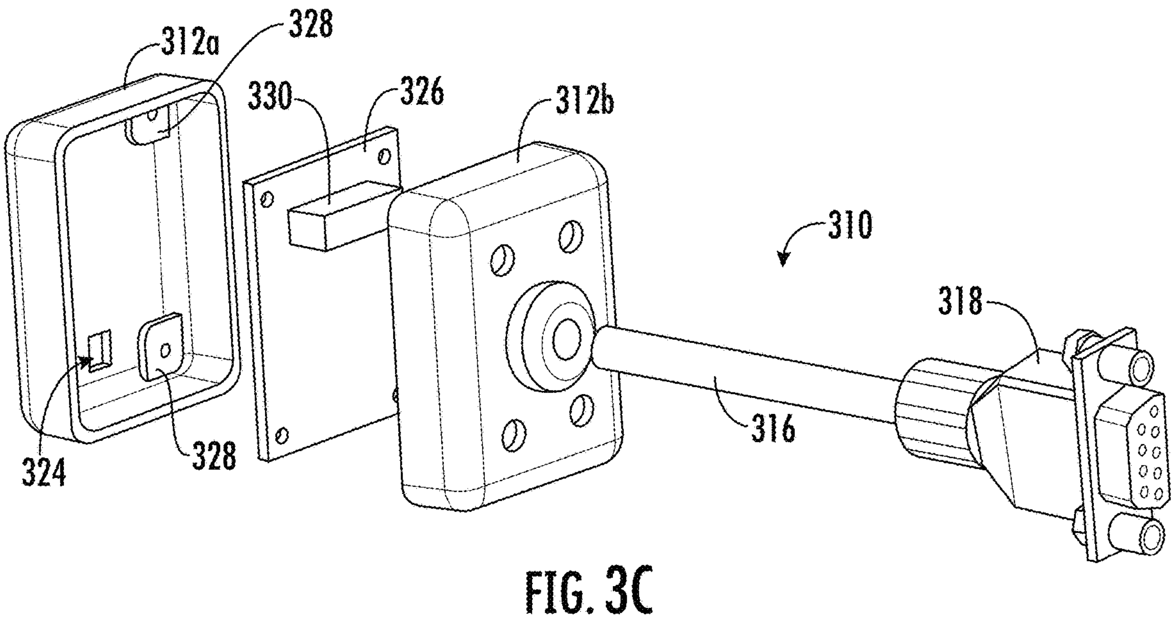
FIG. 3C is an alternative view of the motion state sensing assembly of FIG. 3B.

Referring now to FIGS. 3A-3C, schematic illustrations of an elevator car guiding device 300 and features thereof, in accordance with an embodiment of the present disclosure, are shown. The elevator car guiding device 300 includes a set of rollers 302*a-c* that are configured to engage with and rotate along a guide rail of an elevator system, as described above. A first roller 302*a* is supported on a rotating shaft 304*a* that is rotatably mounted within or to a support bracket 306*a*. A second roller 302*b* is supported on a respective rotating shaft 304*b* that is rotatably mounted within or to a respective support bracket 306*b*. A third rotating shaft and support bracket associated with a third roller 302*c* are not shown in the view of FIG. 3A. The support brackets, referred to collectively as support bracket 306, may be integrally formed with or attached to a mounting base 308. The mounting base 308 defines at least part of a roller guide frame that is used to mount and support rolling components to an elevator car, as shown and described above.

To provide motion state sensing, as described herein, the elevator car guiding device 300 includes a motion state sensing assembly 310 mounted thereto. As shown, the motion state sensing assembly 310 includes a sensor housing 312 that is mounted and/or otherwise is fixedly attached to the mounting base 308 of the elevator car guiding device 300, such as by a sensor mounting bracket 314. As shown in FIGS. 3B-3C, the sensor housing 312 includes a first housing element 312*a* and a second housing element 312*b* that may be attached together to house one or more components of the motion state sensing assembly 310, such as electronic and/or electrical components thereof (e.g., PCB, optical encoder, accelerometer, processor, etc.). As shown, a cable 316 extends from the sensor housing 310 and provides an electrical and/or communication path through which power and/or data may be transmitted to/from the electrical components. At an end of the cable 316 may be a connector 318 that may electrically connect to an electrical bus of the elevator system or to some other electrical component or connector.

In this configuration, the motion state sensing assembly 310 is arranged relative to the first roller 302*a* and is configured to monitor a rotation of the first roller 302*a*. To achieve such monitoring, the first roller 302*a* is provided with an optical target 320. The optical target 320 is a feature applied or present on a surface of the first roller 320*a*. In some embodiments, the optical target 320 is a color-coded pattern. In one such example, the optical target 320 may be formed of two or more alternating colors of markers that are distributed about a circumferential or side surface of the first roller 302*a*. In other embodiments, the optical target 320 may be formed from angled or faceted surfaces. The optical target 320 may be configured or selected such that the amount or intensity of reflected light is different between one marker and an adjacent marker about a circumference or surface of the first roller 302*a* (e.g., reflective and non-reflective surfaces). It will be appreciated that various different configurations are possible for the arrangement of the optical target 320 without departing from the scope of the present disclosure.

To measure the rotation of the first roller 302*a*, the motion state sensing assembly 310 includes an optical encoder element 322, as shown in FIG. 3B. The optical encoder element 322 may include an optical energy source and an optical energy sensor configured to detect reflected optical energy that is reflected from the optical target 320. As shown, the first housing element 312*a* includes an opening 324 that is arranged to align with the optical encoder element 322. In some embodiments, the opening 324 may be a hole or aperture formed in the first housing element 312*a*. In other embodiments, the opening 324 may include a window or other structural element that may seal or prevent debris from entering the opening 324 while permitting optical energy (e.g., light) to pass therethrough.

The optical encoder element 322 is mounted on a PCB 326 that is housed within the housing 312. As shown in FIG. 3C, for example, the PCB 326 may attach to the first housing element 312*a* at one or more PCB attachment points 328. The retention of the PCB 326 within the housing 312 may be achieved by other means, such as interference fit, adhesives, fasteners, or the like. The PCB 326 is a printed circuit board that includes printed circuits for transmitting power and/or data between elements of the motion state sensing assembly 310. For example, although not shown for simplicity and as will be appreciated by those of skill in the art, printed wiring and circuits may electrically and communicatively connect the optical encoder element 322 with a processor 330 mounted to the PCB 326 and/or to the cable 316 and connector 318. The PCB 326 may also include other components, such as an accelerometer 332.

The electronic components of the motion state sensing assembly 310 can be configured to measure various motion state properties of an elevator car. For example, the optical encoder element 322 may be configured to detect rotational motion of the first roller 302*a* by directing light at the optical target 320 and measuring reflections thereof. Additionally, the accelerometer 332 may be arranged on the PCB 326 to detect changes in motion of the elevator car. It will be appreciated that the information obtained at the optical encoder element 322 and at the accelerometer 332 may be similar and thus can provide for redundancy and/or corrections, as will be appreciated by those of skill in the art. That is, both devices may generate motion state information (e.g., related to position, speed, velocity, and/or acceleration).

In operation, the optical encoder element 322 may detect the rate of change of the optical target 320 to determine a speed of the first roller 302*a*, and thus a speed of the elevator car may be obtained. In some embodiments, the optical encoder element 322 may include two channels (e.g., "A" channel and "B" channel) that are configured to enable directional information (e.g., up or down travel of the elevator car in the elevator shaft). As such, in addition to obtaining speed information, the optical encoder element 322 may also obtain directional information and thus obtain a velocity of travel (speed and direction). In some such configurations, the direction may be obtained based on which channel (e.g., channel "A" or channel "B") leads in a given period of time (e.g., which channel detects a change in the optical target 320 first). For example, during a clockwise rotation of the first roller 302*a*, channel "A" may detect a change from a first optical marker element to a second optical marker element before channel "B" detects the same change from the first optical marker element to the second optical marker element. In contrast, in a counter-clockwise rotation of the first roller 302*a*, channel "B" may detect a change from a first optical marker element to a second optical marker element before channel "A" detects the same change from the first optical marker element to the second optical marker element. In other configurations, and alternatively or in combination with a two-channel configuration, the optical target 320 may be configured to have features or elements that are indicative of a direction of travel. Such configurations may include specific markings (e.g., two special markings that are indicative of travel based on which special marking is detected first during a measurement). In still further embodiments, the information obtained at the motion state sensing assembly may be combined with information from other sensors or systems, such as an elevator machine encoder or the like.

In some embodiments, such as shown in FIGS. 3A-3C, the optical encoder element 322 and the accelerometer 332 may be arranged in communication with the processor 330 that is mounted on the PCB 326. The processor 330 may be configured to receive data signals from the optical encoder element 322 and the accelerometer 332 and perform data processing thereon. For example, in one non-limiting example, the optical encoder element 322 may output an analog signal that is processed at the processor 330 into a digital signal and/or digital data. The processor 330 may also similarly receive data or a signal from the accelerometer 332. The processor 330 may perform data and/or signal analysis on the received signals/data. As such, the processor 330 may calculate motion state information (e.g., position, speed, velocity, and/or acceleration of an elevator car within an elevator shaft). The processor 330 may transmit the motion state information to an elevator controller 334 (shown in FIG. 3A) through the cable 316 and/or through a wireless connection. In embodiments that use a wireless communication, a wireless communication chip and/or associated communication protocol may be incorporated on and/or in the PCB 326 and/or processor 330. The cable 316 and the connector 318 and/or a wireless protocol and associated components for communication may be generally referred to as a communication assembly of the motion state sensing assembly 310.

Figure 4A:
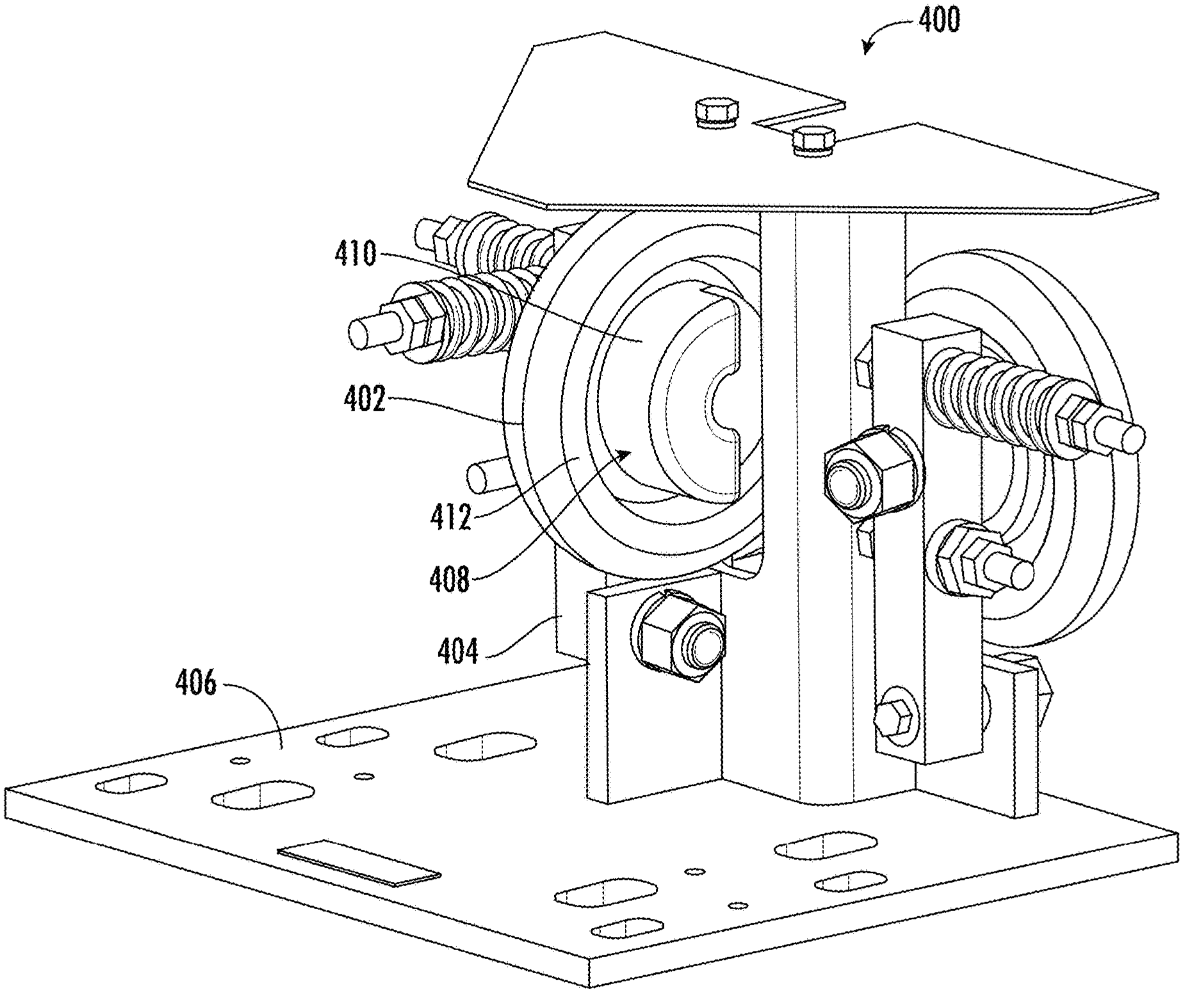
FIG. 4A is a schematic illustration of an elevator car guiding device in accordance with an embodiment of the present disclosure.
Figure 4B:
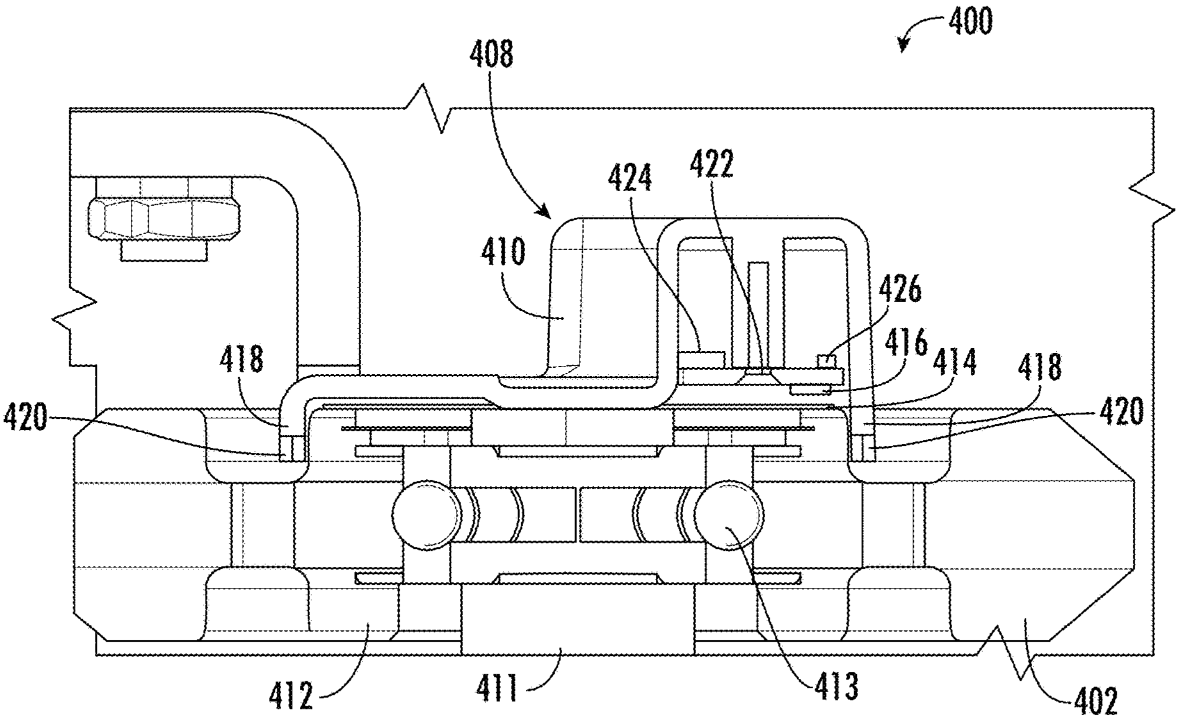
FIG. 4B is a cross-sectional view of a portion of the elevator car guiding device of FIG. 4A, including features of a motion state sensing assembly associated therewith.
Figure 4C:
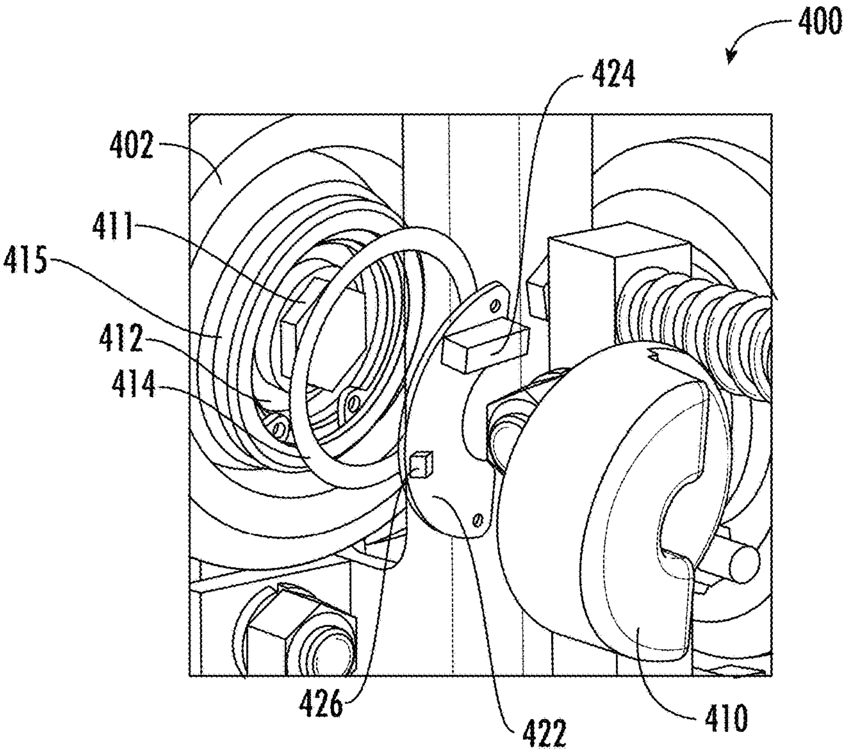
FIG. 4C is another schematic illustration of features of the motion state sensing assembly and elevator car guiding device of FIG. 4A.

Referring now to FIGS. 4A-4C, schematic illustrations of an elevator car guiding device 400 and features thereof, in accordance with an embodiment of the present disclosure, are shown. The elevator car guiding device 400 includes a set of rollers, including a roller 402, that are configured to engage with and rotate along a guide rail of an elevator system, as described above. The roller 402 is supported on a non-rotating shaft 411 (e.g., fixed axle or the like) that is mounted within or to a support bracket 404, with the roller 402 being rationally supported on the non-rotating shaft 411 by one or more bearings 413. The support bracket 404 may be integrally formed with or attached to a mounting base 406 of the elevator car guiding device 400. The mounting base 406 defines at least part of a roller guide frame that is used to mount and support rolling components to an elevator car, as shown and described above.

Similar to the embodiment of FIGS. 3A-3C, the elevator car guiding device 400 includes a motion state sensing assembly 408 mounted thereto. In some embodiments, and as shown, the motion state sensing assembly 408 includes a sensor housing 410 that is mounted and/or otherwise is fixedly attached relative to the roller 402. As shown in FIG. 4B, the housing 410 may be fixedly attached to the non-rotating shaft 411 of the roller 402. As noted above, the roller 402 may be rotationally supported on the non-rotating shaft 411 by the one or more bearings 413. By affixing the motion state sensing assembly 408 to the non-rotating shaft 411 about which the roller 402 rotates, the position and accuracy of the motion state sensing assembly 408 may be improved. That is, the motion state sensing assembly 408 may be fixed about a central rotational axis of the roller 402 and thus components of the motion state sensing assembly 408 may be appropriately aligned and also may eliminate the need for a support bracket, frame, or the like (e.g., may eliminate a sensor mounting bracket). In other configurations, the sensor housing 410 may be mounted to the mounting base 406 or a frame portion thereof of the elevator car guiding device 400, such as by a sensor mounting bracket or the like. In some embodiments, the motion state sensing assembly 408 may be attached or mounted to a pivot arm and will move with the pivot arm when the arm is moved (i.e., the motion state sensing assembly 408 is fixedly mounted to the pivot arm).

As shown in FIGS. 4A-4C, the sensor housing 410 is shaped to fit about a portion of the roller 402, such as a portion of a hub 412 of the roller 402. In this configuration, the housing 410, in contrast to the embodiment of FIGS. 3A-3C, is a single body housing configured to house one or more components of the motion state sensing assembly 408, such as electronic and/or electrical components thereof (e.g., PCB, optical encoder, accelerometer, processor, etc.). Although not shown in this specific illustrative embodiment, a cable and/or electrical connector may be arranged to pass through a portion of the housing to electrically and electronically connect to one or more components of the motion state sensing assembly 408.

As shown, the motion state sensing assembly 408 is arranged relative to the roller 402 and is configured to monitor a rotation of the roller 402. To achieve such monitoring, the roller 402 is provided with an optical target 414. The optical target 414 is a feature applied or present on a surface 415 of the roller 402, such as a portion of the hub 412 of the roller 402. In some embodiments, the optical target 414 is a color-coded pattern. In one such example, the optical target 414 may be formed of two or more alternating colors of markers that are distributed about a circumferential or side surface of the roller 402. In other embodiments, the optical target 414 may be formed from angled or faceted surfaces. The optical target 414 may be configured or selected such that the amount or intensity of reflected light is different between one marker and an adjacent marker about a circumference or surface of the roller 402. It will be appreciated that various different configurations are possible for the arrangement of the optical target 414 without departing from the scope of the present disclosure.

To measure the rotation of the roller 402, the motion state sensing assembly 408 includes an optical encoder element 416, as shown in FIG. 4B. The optical encoder element 416 may include an optical energy source and an optical energy sensor configured to detect reflected optical energy that is reflected from the optical target 414. In this embodiment, rather than including an opening or hole formed in the housing 410 (e.g., as present in the configuration of FIGS. 3A-3C), the housing 410 is arranged to encapsulate or cover the optical target 414 on the roller 402. That is, the housing 410 may house the components of the motion state sensing assembly 408 and a portion of the roller 402. This arrangement may provide for improved debris or dust interaction with the motion state sensing assembly 408. As shown, the housing 410 includes a housing extension 418 that is configured to engage with a portion of the roller 402. The housing extension 418 may be a full circle or other shape that is configured to provide engagement with the roller 402 and provide a blocking wall. In some embodiments, for example, the housing extension 418 may include one or more seal elements 420. The seal elements 420 may be configured to provide sealing of the interior of the housing 410 from external debris and/or dust. In other embodiments, the seal element 420 may be a rotating seal that is attached to the hub 412 of the roller 402 and rotates with rotation of the roller 402. In such embodiments, the seal element may engage with the end or edge of the housing extension 418 to provide a sealing engagement.

The optical encoder element 416 is mounted on a PCB 422 that is housed within the housing 410. The retention of the PCB 422 within the housing 410 may be achieved by various means or mechanisms, such as interference fit, adhesives, fasteners, or the like, as will be appreciated by those of skill in the art. The PCB 422 is a printed circuit board that includes printed circuits for transmitting power and/or data between elements of the motion state sensing assembly 408. For example, although not shown for simplicity and as will be appreciated by those of skill in the art, printed wiring and circuits may electrically and communicatively connect the optical encoder element 416 with a processor 424 and/or accelerometer 426 mounted to the PCB 422 and/or to a cable and/or connector, as shown and described above.

The electronic components of the motion state sensing assembly 408 can be configured to measure various motion state properties of an elevator car. For example, the optical encoder element 416 may be configured to detect rotational motion of the roller 402 by directing light at the optical target 414 and measuring reflections thereof. Additionally, the accelerometer 426 may be arranged on the PCB 422 to detect changes in motion of the elevator car. It will be appreciated that the information obtained at the optical encoder element 416 and at the accelerometer 426 may be similar and thus can provide for redundancy and/or corrections, as will be appreciated by those of skill in the art. That is, both devices may generate motion state information (e.g., related to position, speed, velocity, and/or acceleration).

The optical encoder element 416 and the accelerometer 426 may be arranged in communication with the processor 424 that is mounted on the PCB 416. The processor 424 may be configured to receive data signals from the optical encoder element 416 and the accelerometer 426 and perform data processing thereon. For example, in one non-limiting example, the optical encoder element 416 may output an analog signal that is processed at the processor 424 into a digital signal and/or digital data. The processor 424 may also similarly receive data or a signal from the accelerometer 426. The processor 424 may perform data and/or signal analysis on the received signals/data. As such, the processor 424 may calculate motion state information (e.g., position, speed, velocity, and/or acceleration of an elevator car within an elevator shaft). The processor 424 may transmit the motion state information to an elevator controller through a cable and/or through a wireless connection. In embodiments that use a wireless communication, a wireless communication chip and/or associated communication protocol may be incorporated on and/or in the PCB 422 and/or processor 424. Although not shown in FIGS. 4A-4C, in a wired connection, a cable or the like, similar to that shown in FIGS. 3A-3C, may be incorporated into the assembly and system.

In some embodiments of the present disclosure, the accelerometer may be omitted and the motion state sensing assembly may be configured to monitor a motion state of an elevator car with only the optical encoder device and the associated optical target. In other embodiments, the accelerometer may be provided as an additional motion state sensor focused on measuring acceleration or changes in motion state of an associated elevator car. As noted above, the data collected by the optical encoder device and/or the accelerometer may be collected at a central processor and directly processed onboard the motion state sensing assembly or may be transmitted to a remote processor for processing (e.g., processor or controller of an elevator machine).

In accordance with some embodiments of the present disclosure, the optical encoder device may be an optical encoder device having two channels (e.g., main and rescue encoder), a shaft interface (e.g., for interfacing with a shaft of the roller), a mounting disk (e.g., for mounting an optical target), and associated seals. In other embodiments, and in accordance with a non-limiting example, the optical encoder device may have fewer components. For example, in some embodiments, the optical encoder device may include a single channel with a relatively smaller PCB and only a single cable/connector. The reduction in components can reduce the size of the housing and/or supporting elements, such as mounts, seals, and the like. In some embodiments, the motion state sensing assemblies may include two separate optical encoder devices, each having two channels. The two channels of each optical encoder device may be used to determine a direction of travel (e.g., as described above), and the two optical encoder devices may be employed to perform a check, error correction, failure detection, confirmation, averaging, or the like, as will be appreciated by those of skill in the art.

Figure 5B:
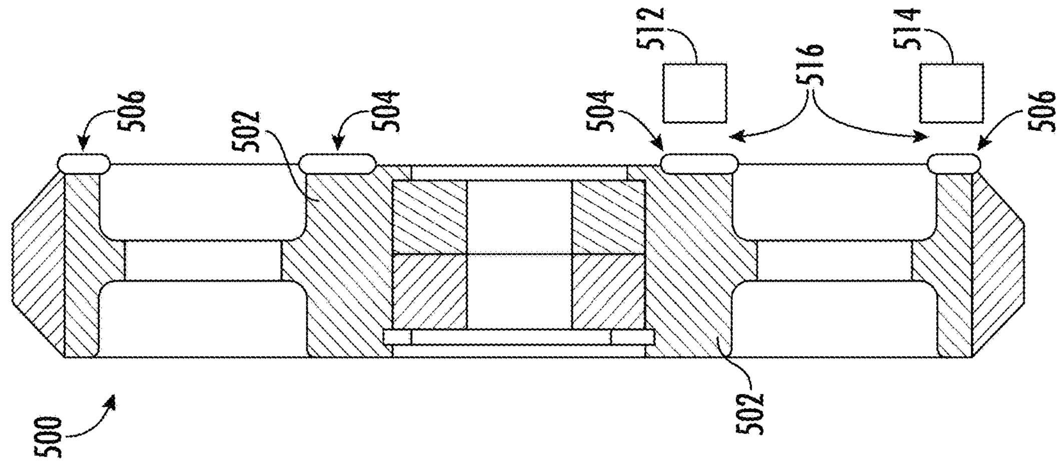
FIG. 5B is a side, cross-sectional view of the roller of FIG. 5A.
Figure 5A:
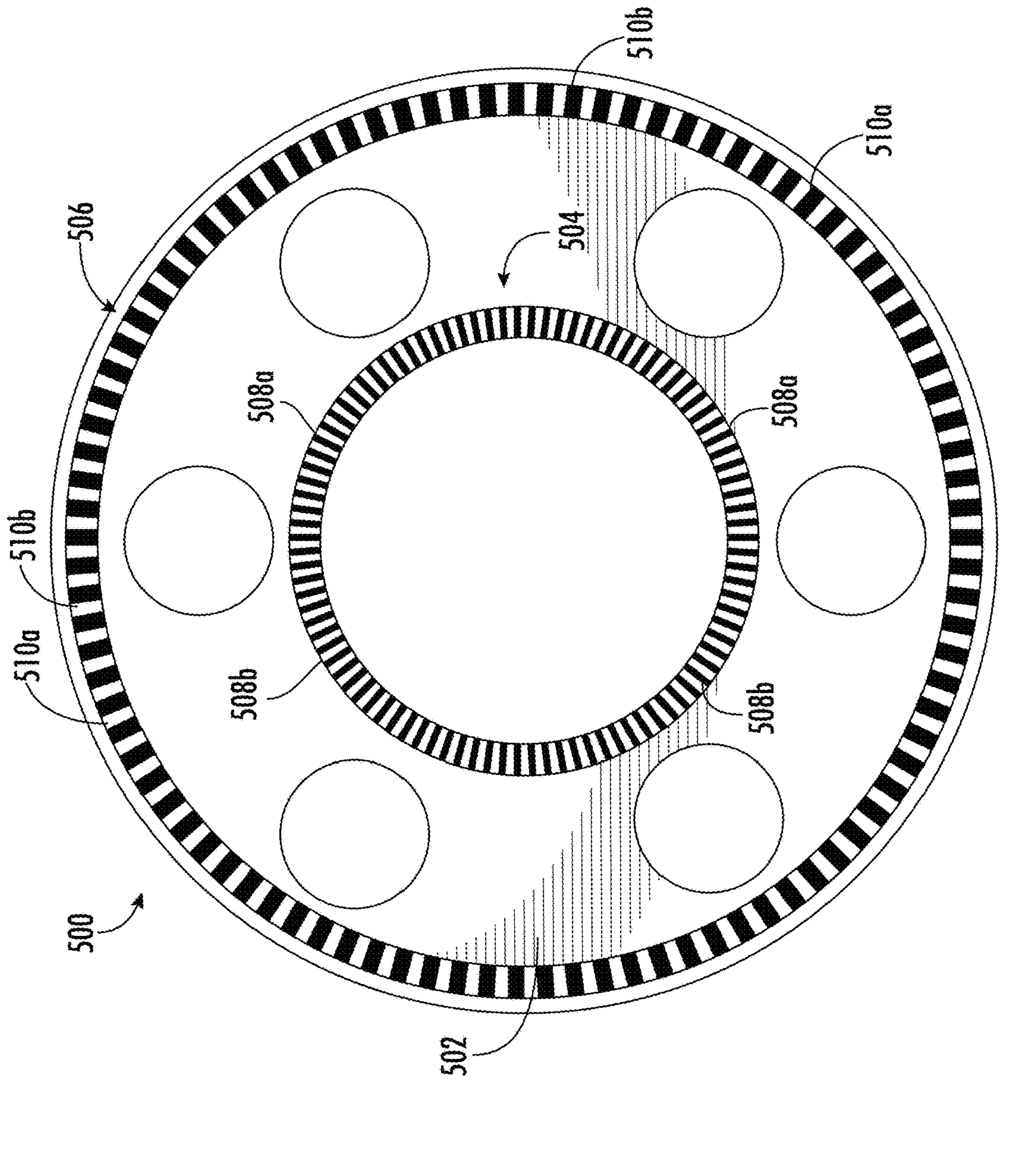
FIG. 5A is a schematic illustration of a roller in accordance with an embodiment of the present disclosure.

Referring now to FIGS. 5A-5B, schematic illustrations of a roller 500 for use with embodiments of the present disclosure are shown. The roller 500 is configured to be mounted to a frame or the like and supported on an elevator car. The roller 500 is configured to roll along or against a guide rail to guide an elevator car along an elevator shaft. For example, the roller 500 may be part of an elevator car guiding device similar to that shown and described above. In this embodiment, the roller 500 includes a hub 502 having two optical targets 504, 506 applied thereto. In this configuration, a first optical target 504 is arranged at an inner diameter of the hub 502 and a second optical target 506 is arranged at an outer diameter of the hub 502. In some embodiments, only a single optical target (target 504 or target 506) may be employed.

Each of the first optical target 504 and the second optical target are formed of a series or pattern of marking that are selected to alter incident optical energy (e.g., reflect, absorb, deflect, block, disperse, etc.). For example, in this non-limiting embodiment, the first optical target 504 includes an alternating pattern of markings 508*a*, 508*b*, and the second optical target 506 includes an alternating pattern of markings 510*a*, 510*b*. On each optical target 504, 506 a first set of markings 508*a*, 510*a* may be a set of non-reflective markings and a second set of markings 508*b*, 510*b* may be a set of reflective markings. As such, as the roller 500 is rotated, incident optical energy, such as sourced from an optical encoder device (as described above), will be reflected or not, based on the presence of a first marking 508*a*, 510*a* (not reflective) or a second marking 508*b*, 510*b* (reflective). Based on the alternating pattern and detected reflected light (or absence of reflected light) an optical encoder device and/or associated computer processing elements may measure a rate of rotation of the roller 500, and thus a speed may be obtained. When there is a known starting position of the roller, such as in or along an elevator shaft, the system can determine a position based on the number of rotations of the roller 500. Further, by monitoring changes in rate of rotation, an acceleration may be measured. Accordingly, by incorporating the optical targets 504, 506 on the roller 500, in combination with an associated optical encoder device, systems as described herein are configured to measure various motion state data of an associated elevator car.

In a non-limiting example, the optical targets 504, 506 may be set with a particular resolution (e.g., markings per unit distance) to enable accurate measurement of the rotation of the roller 500. For example, and without limitation, in one example embodiment, the optical targets 504, 506 may have a concentration of markings (e.g., lines) of about 10-15 lines per mm (e.g., in one example and based on the size of the roller, the concentration may be 11.579 lines per mm). In one such example, the first optical target 504 may have approximately 2,000 PPR (pulses per revolution) or greater, resulting in a car movement resolution of about 0.25 mm and the second optical target 506 may have approximately 5000 PPR, resulting in a car movement resolution of about 0.10 mm. In some such configurations, the optical encoder device may include a built-in interpolation of 2× or 4×, resulting in the above PPR resolution to be improved by 2× or 4×. Further, in some embodiments that incorporate a built-in interpolation, such as 2× or 4×, only a single optical encoder element may be employed (e.g., only first/inner optical target 504), resulting in a resolution of about 4,000 PPR (for 2× interpolation) or about 8,000 (for 4× interpolation). In some examples that employ a 4× interpolation, the resulting car movement resolution may be 0.05 mm to 0.10 mm per pulse.

As shown in FIG. 5B, the first optical target 504 may have an associated first optical encoder element 512 arranged relative thereto. Similarly, the second optical target 506 may have an associated second optical encoder element 514 arranged relative thereto. Each of the optical encoder elements 512, 514 may be separated or spaced from the respective optical targets 504, 506 by a separation gap 516 to prevent contact therebetween, but set sufficiently close to provide for an accurate motion state sensing operation. In some embodiments, the separation distance 516 between the optical encoder devices 512, 514 (optical source thereof and associated detector) and the associated optical targets 504, 506 may be a separation distance of 0.5-1.25 mm. It will be appreciated that in the configuration of FIGS. 5A-5B, the motion state sensing assembly may include the two optical encoder devices 512, 514, either housed in a single housing or in two separate housings. In embodiments having two optical encoder devices and respective optical targets, the data obtained from each optical encoder device may be used for corrective calculations and/or provide for redundancy of measurements. Although shown in FIG. 5B with two optical encoder devices and two associated optical targets, the described separation distance 516 may be employed in a single device configuration (e.g., one optical encoder device and one optical target on the roller).

Advantageously, embodiments provided herein provide an integrated motion state sensing assembly into a roller guide of an elevator car to thus provide accurate motion state information of the elevator car within the elevator shaft. Accordingly, advantageously, for example, direct measurement of elevator car distance from a landing can be obtained for enhanced control of re-leveling (e.g., dynamic compensation control mode of operation). Further, advantageously, motion state sensing assemblies provided herein can be employed, for example, to determine car motion state relative to door zones, car position and/or velocity for motion control, over-speed detection, and/or unintended car movement detection. In some embodiments, the motion state sensing assemblies described herein may be used as primary position systems for an elevator car. In some such embodiments, an elevator motor or machine may not include a motion state encoder, or if such encoder is present, the machine-based encoder may be used as a redundancy or check for corrections or for identifying issues with the system. In some embodiments, the motion state sensing assemblies may be used for improved, continuous releveling control, by providing highly accurate and precise motion state information to a releveling controller or the like. Furthermore, in some configurations, the motion state information obtained by motion state sensing assemblies described herein may be used for feedback or data associated with operation or function of an electronic safety actuator, a normal terminal speed-limiting device (NTSD), an emergency terminal speed-limiting device (ETSD), rope slip and traction monitoring, or the like.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

For example, various configurations and/or designs may be employed without departing from the scope of the present disclosure. In some non-limiting embodiments, a motion state sensing assembly may be arranged relative to a roller wheel of a side-to-side roller, such as that shown and described above (e.g., roller 302*a* shown in FIG. 3A). In another non-limiting embodiment, the motion state sensing assembly can be operably connected to a front-to-back roller (e.g., roller 302*b*, 302*c* shown in FIG. 3A). In such embodiments, the structure, arrangement, and configuration of the motion state sensing assembly can be similar to that shown and described above. It will be further appreciated that multiple motion state sensing assemblies, as described herein, may be incorporated with multiple rollers of an elevator car guiding device. In some such embodiments, the various different motion state sensing assemblies may be used for redundancy, checks, corrections, or the like, as will be appreciated by those of skill in the art.

Further, although shown and described above with respect to elevator car guiding devices positioned on the top of an elevator car, those of skill in the art will appreciate that embodiments provided herein can be applied to any elevator car guiding devices (e.g., roller guides) of an elevator system. For example, those of skill in the art will appreciate that a traditional elevator car will be equipped with four roller guides. Embodiments provided herein can be applied to one or more of the roller guides to provide motion state sensing at one or more roller guides of the elevator car. In configurations with multiple motion state sensing assemblies, such as one for each roller guide on an elevator car, the systems may include an averaging operation. For example, when an elevator car has an uneven load distribution, one or more of the roller guides may come out of contact with a respective guide rail, and thus the measurement based thereon may be altered with a period of non-rotation or non-driven rotation. By averaging the measurements from multiple different elevator car guiding devices can eliminate such variations as compared to a single assembly being employed. Such a system may include detection of a roller that may be out of contact with the guide rail, and thus could allow for ignoring the data from a non-contacting elevator car guiding device or providing some other corrective action or correction processing of the data thereof.

Additionally, although shown and described with a single motion state sensor (e.g., an encoder) on the elevator car guiding device, those of skill in the art will appreciate that in some embodiments, multiple motion state sensors can be part of a single elevator car guiding device. In such embodiments, the multiple motion state sensors can measure based on one or more rollers, such that each sensor is configured with respect to a different roller or two or more sensors are configured with respect to a single (the same) roller. Accordingly, various alternative configurations and/or arrangements are considered herein without departing from the scope of the present disclosure.

Accordingly, the present disclosure is not to be seen as limited by the foregoing description, but is only limited by the scope of the appended claims.

What is claimed is:

1. An elevator system comprising:

an elevator car arranged to travel on a guide rail through an elevator shaft;

a roller guide mounted to an exterior of the elevator car;

a roller supported on a frame of the roller guide, the roller configured to engage with and rotate along the guide rail and limit movement of the elevator car in a first direction that is normal to a direction of travel of the elevator car; and a motion state sensing assembly mounted to the roller guide and configured to measure a motion state of the elevator car within the elevator shaft, wherein the motion state sensing assembly comprises:

an optical target located on the roller;

a printed circuit board having an optical encoder device and a processor mounted thereto, wherein the optical encoder device and the processor are electrically connected, and wherein the optical encoder device is arranged to direct optical energy toward the optical target and detect a response of the directed optical energy;

a sensor housing mounted to the roller guide, wherein the optical encoder device is arranged within the sensor housing; and a communication assembly in communication with the processor and an elevator controller, wherein the processor is configured to communicate data from the processor to the elevator controller using the communication assembly.

2. The elevator system of claim 1, wherein the elevator controller is configured to control operation of the elevator car based on the data communicated from the motion state sensing assembly.

3. The elevator system of claim 1, further comprising an accelerometer mounted to the printed circuit board and electrically connected to the processor.

4. The elevator system of claim 3, wherein the processor is configured to receive motion state data from each of the optical encoder device and the accelerometer.

5. The elevator system of claim 1, wherein the sensor housing comprises an opening that is arranged to align with the optical encoder element.

6. The elevator system of claim 1, wherein the communication assembly comprises a wireless communication chip.

7. The elevator system of claim 1, wherein the communication assembly comprises a cable and a connector, wherein the cable electrically connects to the printed circuit board and the connector is configured to connect to another device to transmit the data from the processor to the elevator controller.

8. The elevator system of claim 1, wherein the roller comprises a hub and the optical target is located on a surface of the hub.

9. The elevator system of claim 8, wherein the optical target comprises a first optical target located at an inner diameter of the hub and a second optical target located at an outer diameter of the hub.

10. The elevator system of claim 1, further comprising:

a second roller mounted to the roller guide, wherein the second roller is configured to limit movement of the elevator car in a second direction that is normal to the first direction; and a second motion state sensing assembly associated with the second roller.

11. The elevator system of claim 10, further comprising a third roller mounted to the roller guide, wherein the third roller is configured to limit movement of the elevator car in one of the first direction and the second direction.

12. The elevator system of claim 1, wherein at least one of the sensor housing and the printed circuit board is affixed to a non-rotating axle of the roller.

13. The elevator system of claim 1, wherein the processor is configured to process data received from the optical encoder device to determine a motion state of the elevator car, wherein the motion state comprises at least one of a position, a speed, a velocity, and an acceleration of the elevator car within the elevator shaft.

14. The elevator system of claim 13, wherein at least one of the processed data and the determined motion state is transmitted to the elevator controller using the communication assembly.

15. The elevator system of claim 1, wherein the optical target comprises a pattern of markings about the roller.

16. The elevator system of claim 15, wherein the pattern of markings comprises a concentration of markings of between 10 to 15 lines per mm.

17. The elevator system of claim 15, wherein the pattern of markings comprises a pattern of alternating reflective and non-reflective lines.

18. The elevator system of claim 1, wherein the optical target is configured to generate 2,000 pulses per revolution (PPR) or greater.

19. The elevator system of claim 18, wherein the encoder device comprises an interpolation operation of 2× to 4× resulting in at least 4,000 PPR to 8,000 PPR.

20. The elevator system of claim 1, wherein the optical encoder device is arranged with a separation distance from the optical target of 0.5-1.25 mm.

* * * * *